(12) United States Patent
Spatafora et al.

(10) Patent No.: US 6,341,685 B1
(45) Date of Patent: Jan. 29, 2002

(54) ORDERING DEVICE FOR ARRANGING PRODUCTS RECEIVED IN A LOOSE STATE IN AN ORDERLY SUCCESSION

(75) Inventors: Mario Spatafora; Antonio Gamberini, both of Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 09/543,889

(22) Filed: Apr. 6, 2000

(30) Foreign Application Priority Data

Apr. 8, 1999 (IT) .......................... B099A0162

(51) Int. Cl.⁷ .......................... B65G 43/00; B65G 47/26
(52) U.S. Cl. ................. 198/460.2; 198/460.2; 198/461.3
(58) Field of Search ............................. 198/460.2, 461.3

(56) References Cited

U.S. PATENT DOCUMENTS

| | | | |
|---|---|---|---|
| 3,370,693 A | * 2/1968 | Marsden | .................. 198/460.2 |
| 4,469,219 A | 9/1984 | Cossé | |
| 4,640,408 A | * 2/1987 | Eaves | .......................... 198/460 |
| 4,720,006 A | 1/1988 | Lenherr | |
| 5,322,154 A | * 6/1994 | Lenherr | ....................... 198/460 |
| 5,634,551 A | 6/1997 | Francioni et al. | |
| 5,906,265 A | * 5/1999 | Spatafora | .................. 198/460.2 |

FOREIGN PATENT DOCUMENTS

EP 0 485 845 A1 5/1992

\* cited by examiner

*Primary Examiner*—Christopher P. Ellis
*Assistant Examiner*—Richard Ridley
(74) *Attorney, Agent, or Firm*—The Law Offices of Timothy J. Klima

(57) ABSTRACT

An ordering device for arranging products received in the loose state in an orderly succession comprises a first and a second conveyor with belts defining a product feed path divided into active portions with variable lengths equaling complementary fractions of the total length of the path; a pair of transmission pulleys, respectively connected to the first and second conveyors to define the active portions and supported by a carriage which moves in both directions along the path; drive means designed to move the transmission pulleys so as to vary the length of the portions; compensator means for compensating the variations in the length of the active portions of the path with corresponding opposite variations in the length of the respective complementary sections of the belts; the device comprises one carriage and the compensator means comprise mechanisms equipped with rigid elements which are connected to one another and which connect the carriage and the belts and vary their geometric configuration according to the movements of the carriage.

6 Claims, 2 Drawing Sheets

ORDERING DEVICE FOR ARRANGING PRODUCTS RECEIVED IN A LOOSE STATE IN AN ORDERLY SUCCESSION

BACKGROUND OF THE INVENTION

The present invention relates to an ordering device for arranging products received in a loose state in an orderly succession.

The present invention is advantageously applied in the manufacture of an ordering device for feeding products in general, and sweets or chocolates in particular, to a wrapping machine, to which the description below makes specific reference, although without limiting the scope of application of the invention.

Ordering devices of the above-mentioned type are normally installed between a wrapping machine, designed to receive the products to be wrapped in an orderly succession, that is to say, at a constant distance from one another, and a feed device of the type described, for example, in U.S. Pat. No. 4,469,219, designed to feed aligned, orderly products in succession, at a precise regular distance from one another.

European Patent No. 485,845 describes known ordering devices designed to feed an orderly succession of products received in the loose state to an operating machine, of the type comprising first and second conveyors with belts which are closed in a loop around respective transmission pulleys and positioned side-by-side to define a product feed path with preset total length, and comprising first and second active portions with variable lengths, equal to complementary fractions of the total length. The transmission pulleys connected to the two conveyor belts define the first and second active portions, supported by a carriage which moves in both directions parallel with said path. There are also drive means which drive the carriage to move the transmission pulleys so as to vary the length of the first and second portions, and means for compensating the variations in the length of the active portions of the path with corresponding opposite variations in the length of complementary sections, respectively active and passive, of the belts.

In the known devices of the type described above, the compensator means are integrated in the drive means and normally comprise a looped belt, which is divided into two portions with substantially equal length by two carriages, which slide on respective guides parallel with the first and second portions and support the belt transmission pulleys.

The upper carriage is positioned in the zone at which the two belts are separated, to which the products are transferred in succession, whilst the lower carriage, translating inside the device structure in the direction opposite to that of the upper carriage, compensates the variations in the length of the active sections of the belts, and suitably tensions the belts.

In the known ordering devices in question, the presence of long belts, which run almost the entire length of the device, although useful, creates several disadvantages, especially when the products received in the loose state are quite close together and/or the device operates at high speeds.

In such conditions, the products are arranged at a precise regular distance from one another in an orderly succession with brief, rapid movements of the carriage, which is, therefore, subject to sudden acceleration and stops. As a result of the forces of inertia which subject the carriages to stress, the belts are subjected to equally sudden stresses which mean that product positioning is not perfectly regular and, if repeated a significant number of times, rapidly cause the belts to wear.

The aim of the present invention is to provide an ordering device of the above-mentioned type, which overcomes the above-mentioned disadvantages.

SUMMARY OF THE INVENTION

Accordingly, the present invention provides an ordering device for arranging products, received from a feed device, in an orderly succession to feed an operating machine. The device includes first and second conveyor means with belts which are closed in loops and aligned with one another to form a product feed path with a preset total length, said path including first and second active portions, with variable lengths equaling complementary fractions of the total length; there being transmission means connected to the belts to define said first and second active portions, supported by a carriage which moves in both directions parallel with the feed path; drive means operating on the carriage to move the transmission means and so vary the length of the first and second portions; means for compensating the variations in the length of the active portions of the path with corresponding opposite variations in the length of complementary sections, respectively active and passive, of the belts, the device comprising only one carriage, the compensator means comprising mechanisms which have rigid elements that are joined to one another to form a linkage connecting the carriage and the belts in such a way as to vary the geometric configuration of the belts according to the movements of the carriage.

BRIEF DESCRIPTION OF THE DRAWINGS

The invention will now be described with reference to the accompanying drawings, which illustrate an embodiment of the invention, without limiting the scope of its application, and in which.

DESCRIPTION OF THE PREFERRED EMBODIMENTS

Figure 1:
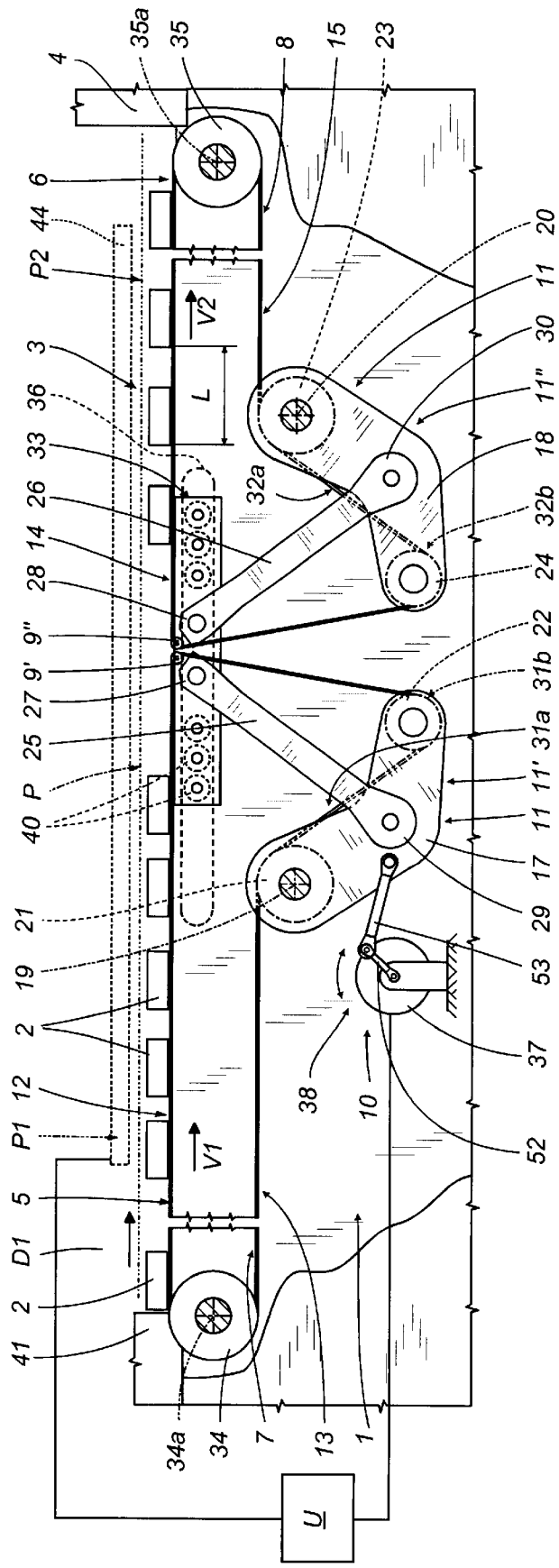
FIG. 1 is a partial schematic side elevation view, with some parts cut away to better illustrate others, of a preferred embodiment of the device according to the present invention, in a first operating configuration.

With reference to the accompanying drawings, the numeral 1 indicates as a whole an ordering device which basically comprises a first and a second conveyor 5, 6 with belts 7, 8, arranged in succession in a substantially horizontal feed direction D1. The conveyors are designed to receive, on the belts 7, 8, products 2 supplied in the loose state in a disorderly, random succession, from a feed machine (not illustrated), and to arrange them in a regular, orderly succession 3, in which the products 2 are at a regular distance from one another, then transfer them to an operating machine 4, in particular a wrapping machine, located downstream of the second conveyor 6 in direction D1.

The first conveyor 5 is designed to receive the products 2 in the loose state arriving from a feed device 41, whilst the conveyor 6 is designed to feed the regular, orderly succession 3 of products to the operating machine 4.

Figure 2:
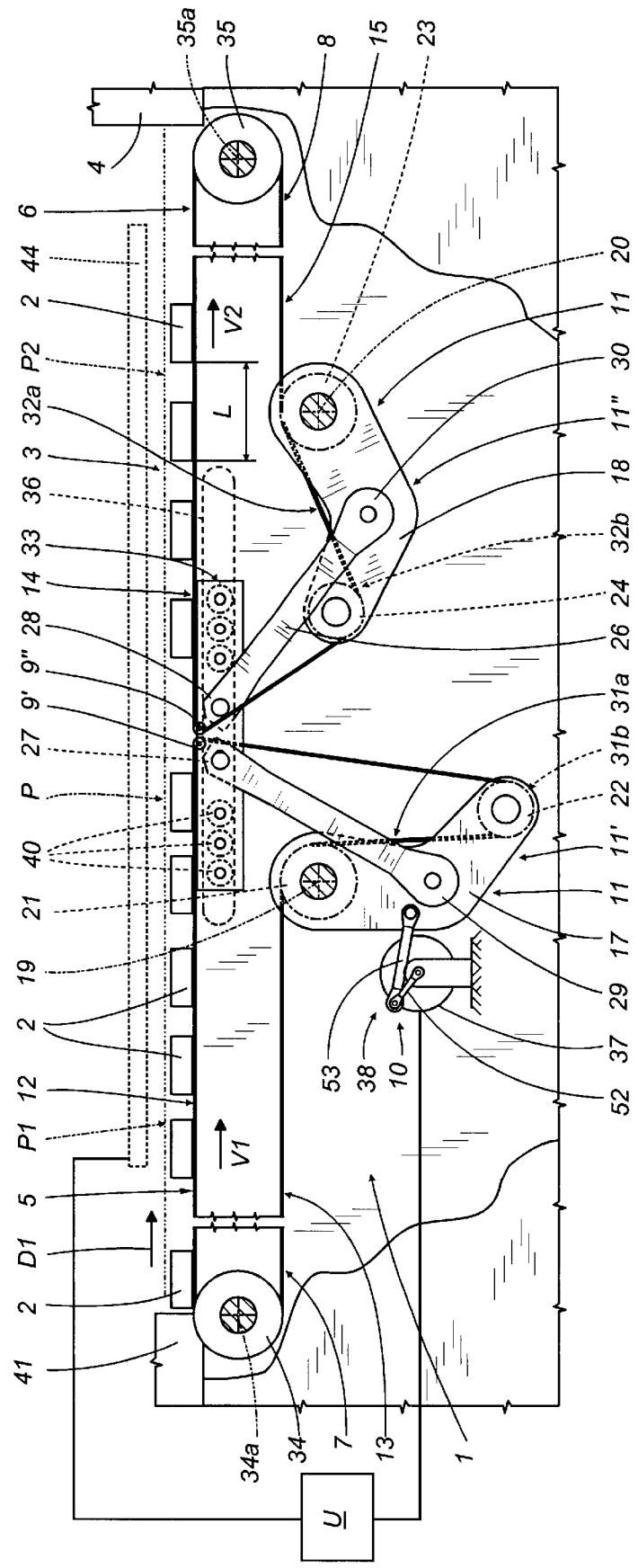
FIG. 2 is a partial schematic side elevation view of the device illustrated in FIG. 1, in a second operating configuration.

As illustrated in FIGS. 1 and 2, the belts 7, 8 are in a closed loop configuration, have respective active, straight upper sections 12, 14 and passive, mixed-shape lower sections 13, 15 and are positioned side-by-side so that together, in said direction D1, they form an overall shared feed path P for the products 2 which has a preset total length, but which comprises first and second active portions P1, P2, for transferring the products 2, the portions, in turn, being of variable lengths, equal to complementary fractions of the total length.

Attached to the belts 7, 8, inside the relative looped paths, there are a first and a second mobile transmission pulley 9', 9", referred to using the generic term "transmission means", which, together with a driving wheel 34 on the first conveyor 5, which rotates about its fixed axis 34a and, respectively, with a driving wheel 35 of the second conveyor 6, which rotates about its fixed axis 35a, and together with the respective sections 12 and 14, constitute the first and second active portions P1, P2 of the feed path P.

The abovementioned transmission pulleys 9', 9", which constitute more generically defined transmission means, are both supported by a carriage 33 which moves backwards and forwards parallel with the path P and in direction D1, and moves in a guide 36, illustrated as a slot made in the structure of the device 1, on rollers 40.

As illustrated in FIGS. 1 and 2, the numeral 10 indicates, as a whole, drive means designed to move the carriage 33, allowing the transmission pulleys 9', 9" to be moved, so as to vary, instant by instant, the length of the first and second portions P1, P2 of the path P according to the requirements imposed by the product 2 ordering stage and as is described in more detail below.

The device 1 also has compensator means 11 for compensating the variations in the length of the active portions P1, P2 of the path P with corresponding opposite variations in the length of the complementary sections 12, 14 and 13, 15, respectively active and passive, of the belts 7, 8.

Said compensator means 11 comprise mechanisms 11', 11" respectively equipped with rigid elements 17, 18, 25, 26 which are joined to one another to form a linkage that connects the carriage 33 to the belts 7, 8 in such a way as to vary the geometric configuration of the belts 7, 8 according to the movements of the carriage 33.

The mechanisms 11', 11" respectively comprise first rocker arms 17, 18 mounted in such a way that they oscillate about respective first axes of rotation 19, 20. Each has a pair of pulleys, respectively 21, 22 and 23, 24, positioned adjacent to one another, about which the belts 7, 8 are wound so as to form loops 31a, 31b and, respectively, 32a, 32b, with opposite concavity.

The mechanisms 11', 11" also comprise a first and a second arm 25, 26, each with a first end 27, 28 linked to the carriage 33 and a second end 29, 30 linked to the first 17 and second 18 rocker arm, to which the arms 25, 26 are connected in a zone located between the pairs of adjacent pulleys 21, 22 and 23, 24.

The axes of rotation 19, 20 of the rocker arms 17, 18 are preferably fixed and one pulley 21, 23 in the respective pairs of pulleys is mounted coaxially on the axes 19, 20 in such a way that it rotates freely.

As illustrated in FIGS. 1 and 2, the drive means 10 which allow the carriage 33 to be moved comprise a motor 37 (for example, a brushless motor), controlled by the device 1 main control means, labeled U, which operates the crank mechanism 38. The crank mechanism 38 comprises a crankshaft 52 moved by the motor 37, which is linked to an arm 53 directly connected to one of the rocker arms 17, 18 of at least one of the mechanisms 11', 11".

The rocker arm 17 or 18 operates the relative arm 25 or 26 which, in turn, transmits the motion to the carriage 33. As a result, the carriage performs controlled movements along the guide 36. In an embodiment which is not illustrated, the motor 37 could operate a crank mechanism directly connected to the carriage 33.

In practice, the first conveyor 5 is operated at a given speed V1 and loose products 2 are fed on it from the feed device 41.

The products 2 on the conveyor 5 are detected by a sensor 44, which detects the respective positions occupied by the products on the conveyor 5. This data, detected by the sensor 44, is sent to the main control means U, which send a control signal to the motor 37 which, by means of the crank mechanism 38, moves the carriage 33 in such a way as to bring the carriage 33 to a given position.

The position in which the carriage 33 is located, following the motor 37 command, is such that it allows the passage of a product 2 from the first conveyor 5 to the second conveyor 6, which moves at a given speed V2, so that each product 2 is positioned at a given distance L or a multiple of said distance L from a respective product 2 downstream of it in direction D1.

In other words, the passage of a product 2 from the conveyor 5 to the conveyor 6 produces the desired orderly succession 3 in which the products 2 are at a precise regular distance from one another. When a product 2 on the conveyor 5 is too far from the product 2 downstream of it, in order for the carriage 33 to position it at a distance L, the carriage 33 moves, following a law of motion defined by the motor 37, until said product 2 passes from the conveyor 5 to the conveyor 6 in such a way that its position relative to the product 2 downstream of it is a multiple of the abovementioned distance L.

An example of the operation described above is when speeds V1 and V2 are constant, but V1 is lower than V2. In this case, when two consecutive products 2 are separated by a distance slightly greater than the distance L on the first conveyor 5, after the first product 2 has passed onto the second conveyor 6, the carriage 33 moves in the opposite direction to the direction of product 2 feed, speeding up the passage of the second product 2 onto the second conveyor 6 and so reducing the distance between the two products 2 until the distance L is reached. If two consecutive products 2 are separated by a distance smaller than the distance L, after the first product 2 has passed onto the second conveyor 6, the carriage 33 moves in the same direction as the direction of product 2 feed, allowing the first product 2 to move away from the second product at greater speed and so increasing the distance between the two until the distance L is reached. If two consecutive products 2 are separated by a distance much greater than the distance L, after the first product 2 has passed onto the second conveyor 6, the carriage 33 moves in the same direction or the opposite direction, to transfer the second product 2 to a position on the second conveyor 6 which is a multiple of the distance L.

When the carriage 33 is moved, the mechanisms 11', 11" vary their configuration and automatically assume a different configuration which allows them to keep the belts 7, 8 continuously tensioned and to compensate the variations in the length of the active sections 12 and 14 of the belts 7, 8, with equivalent opposite variations in the length of the passive sections 13 and 15.

Since the change in the configuration of the mechanisms 11', 11" as a response to the movements of the carriage 33 is almost instantaneous, the device 1 allows the products 2 to be arranged in a regular fashion at high operating speeds, thus allowing precise positioning of the products 2 on the second conveyor 6.

What is claimed is:

1. An ordering device for arranging products received from a feed device in an orderly succession to feed an operating machine, the device comprising first and second conveyor means, having belts closed in loops and aligned with one another to define a product feed path with preset total length, said path including first and second active portions with variable lengths equaling complementary fractions of the total length; transmission means being connected to the belts to define the first and second active portions and supported by a carriage, the latter moving in both directions parallel with the path; drive means operating on the carriage to move the transmission means so as to vary the length of the first and second portions; compensator means for compensating the variations in the length of the active portions of the path with corresponding opposite variations in the length of complementary sections, respectively active and passive, of the belts, the ordering device comprising a single carriage, the compensator means comprising mechanisms respectively equipped with rigid elements, the latter being joined to one another to form a linkage connecting the carriage to the belts in such a way as to vary the geometric configuration of the belts according to the movements of the carriage.

2. The device according to claim 1, wherein the mechanisms respectively comprise first rocker arms, being mounted in such a way that they oscillate about respective first axes of rotation and each having at least one pair of pulleys which operate together with the respective belts, forming loops with opposite concavity; and a first and second arm, each having a first end linked to the carriage and a second end linked to the respective first and second rocker arms.

3. The device according to claim 2, wherein one of the pulleys in the pairs of pulleys is mounted on the axis of rotation of the respective rocker arm.

4. The device according to claim 2, wherein the axes of rotation of the first rocker arms are fixed.

5. The device according to claim 1, wherein the arms are linked to the rocker arms in a zone located between the pairs of pulleys.

6. The device according to claim 1, wherein the drive means are linked directly to at least one of the mechanisms, through which they transmit motion to the carriage.

* * * * *